United States Patent [19]

Ono et al.

[11] Patent Number: 5,226,857
[45] Date of Patent: Jul. 13, 1993

[54] CHAIN FOR A BICYCLE

[75] Inventors: Takuma Ono, Enumagun; Hiromi Ooya, Kaga, both of Japan

[73] Assignee: Daido Kogyo Co., Ltd., Ishikawa, Japan

[21] Appl. No.: 882,024

[22] Filed: May 13, 1992

[30] Foreign Application Priority Data

May 16, 1991 [JP] Japan .................... 3-067423[U]

[51] Int. Cl.⁵ ............................................. F16G 13/02
[52] U.S. Cl. ................................................. 474/231
[58] Field of Search ................ 474/206, 226, 228–231

[56] References Cited

U.S. PATENT DOCUMENTS 4,102,216 7/1978 Nagano .................... 474/231

FOREIGN PATENT DOCUMENTS 236184 9/1987 European Pat. Off. .
2803222 6/1979 Fed. Rep. of Germany .
20011 of 1896 United Kingdom .

Primary Examiner—Ramon S. Britts
Assistant Examiner—Roger J. Schoeppel
Attorney, Agent, or Firm—Wenderoth, Lind & Ponack

[57] ABSTRACT

A right outer link plate of a bicycle chain, when viewed from the rear and top, has a projection swelling outwardly on a center edge thereof to lead a tooth of a sprocket into an outwardly spread recess formed by the projection. A left outer link plate of the bicycle chain, when viewed from the rear end top, has a flat face outside and an outwardly tapered face along a central inside portion to lead a tooth of the sprocket into a recess formed by the tapered face. In a front multi-stage sprocket, unit the projection of the right outer plate catches onto a tooth of the large sprocket and the tooth slips into the outwardly spread recess formed by the projection, assuring that the chain shifts from the small sprocket to the large sprocket easily. Although the center edge on the right outer link plate swells outwardly, the front multi-stage sprocket unit has a comparatively wide space between sprockets, and the projection does not interfere with the large sprocket and disturb speed changes. On the other hand, in the rear multi-stage sprocket unit, the tapered face catches onto the tooth of the large sprocket and the tooth slips into the recess formed by the tapered face, which enables the chain to shift from the small sprocket to the large sprocket. Despite that the rear multi-stage sprocket unit has a comparatively narrow space between sprockets, the left outer link plate is flat outside, and the outer link plate does not interfere with the large sprocket.

14 Claims, 5 Drawing Sheets

FIG. I
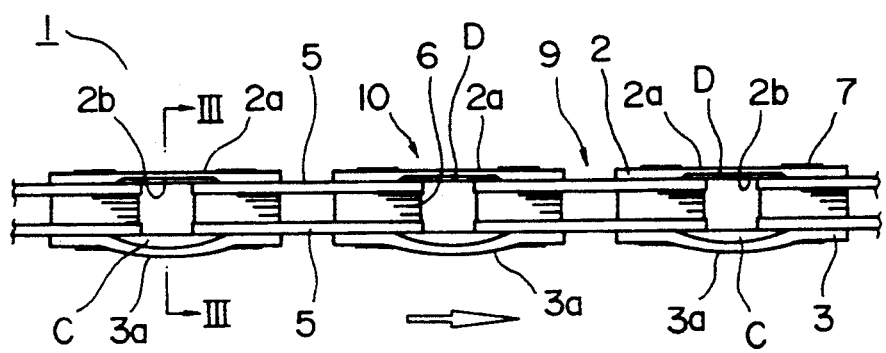
FIG. 2
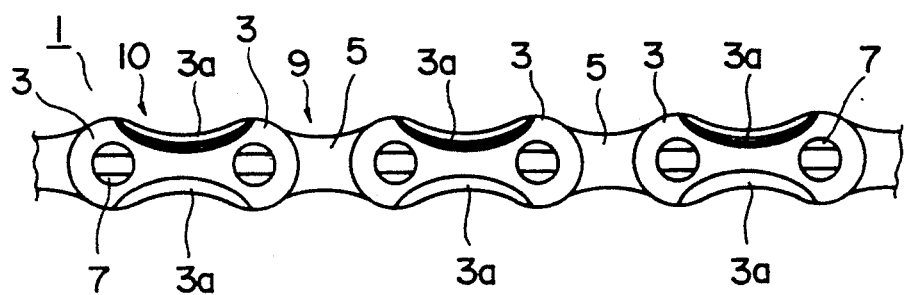

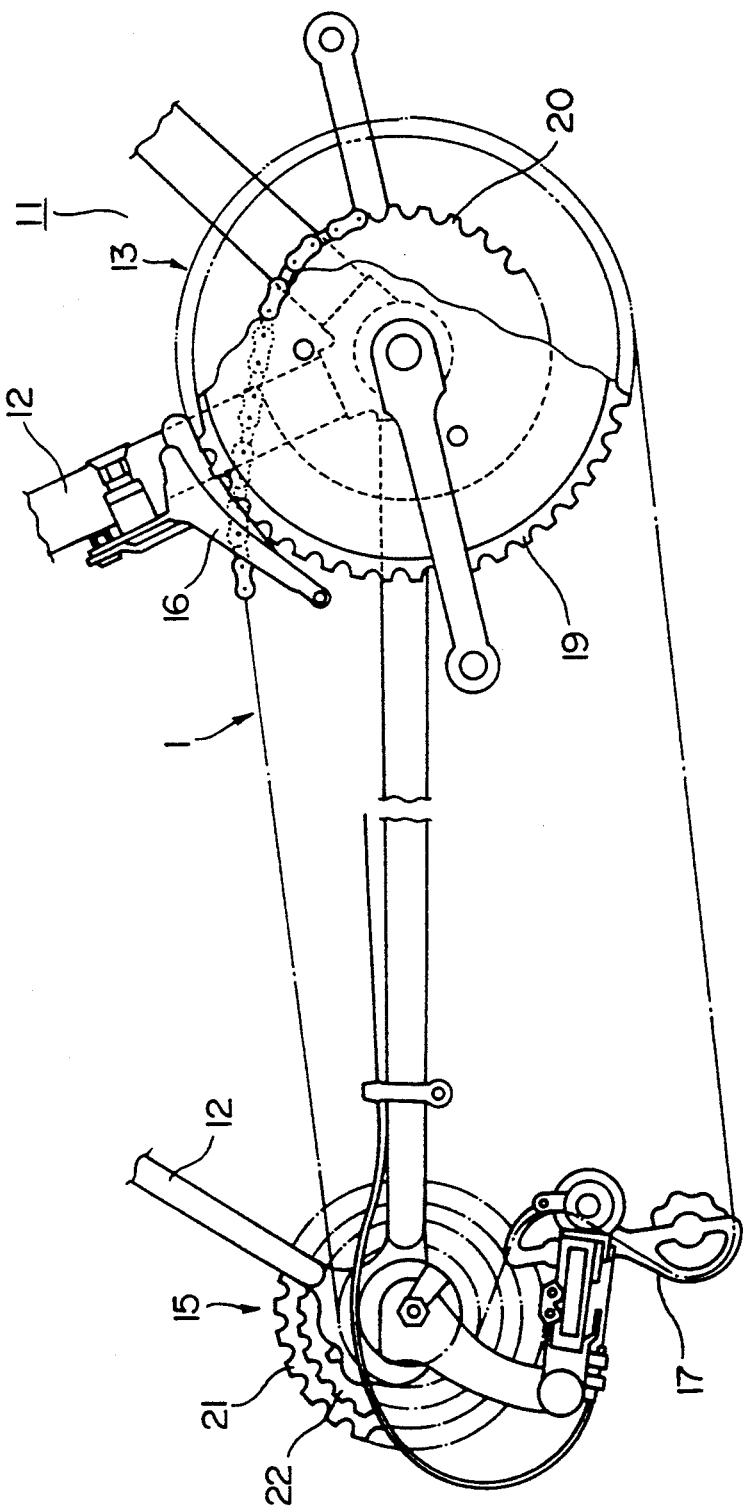

CHAIN FOR A BICYCLE

BACKGROUND OF THE INVENTION

1. FIELD OF THE INVENTION

This invention relates to a chain for a bicycle, and more particularly, to a chain for a bicycle having an exterior gear shifting assembly provided with a front multi - stage sprocket unit to be shifted by a front derailleur, and a rear multi - stage sprocket unit to be shifted by a rear derailleur.

2. DESCRIPTION OF THE INVENTION

In a conventional exterior gear shifting assembly, a chain set around a sprocket of a multi - stage sprocket unit is pushed laterally and displaced by a derailleur fitted immediately before the sprocket. The chain catches onto the next sprocket at the displaced portion, changing the speed. In order for the chain to shift from a large sprocket to a small one, it slips down of itself and fits into the small sprocket due to tension produced by a rear derailleur, providing that it is pushed toward the small sprocket upstream in the large sprocket running direction, and is disengaged with the larger sprocket.

It is difficult, on the contrary, for the chain to shift from the small sprocket to the large one. If the chain is pushed toward the large sprocket upstream is the small sprocket running direction, it will be merely released from the small sprocket but hardly shift to the large one. It is necessary to push the chain further toward the large sprocket until link plate edges of the chain catch onto teeth of the large sprocket. For example, Japanese Utility Model laid open to public inspection, No. JIK-KOUSHO 62 - 29712, discloses the art of modifying the form of a chain to avoid the problem noted above. The disclosed chain has a projection that swells outwardly on the edge of each central portion of the right and left outer link plates, and an outwardly spread recess to lead a tooth of a sprocket. For shifting, the projection catches onto the tooth of the sprocket and then the tooth slips into the outwardly spread recess.

Generally, in an exterior gear shifting assembly, a front multi - stage, sprocket unit has a small number of stages such as two or three stages, while a rear multi - stage sprocket unit had a large number of stages, five or more, for example. And, there is produced a smaller space between the small and large sprockets in the rear multi - stage sprocket unit than in the front multi - stage sprocket unit. This suggests, therefore, that it is preferable for the chain to work on the front - multi sprocket differently than on the rear multi - sprocket unit.

As mentioned above, each edge of the right and left outer link plates of the chain swells outwardly. The projection catches on a tooth of a sprocket to change the speed, and the chain readily shifts from the small sprocket to the large one in the front multi - stage sprocket unit. When it shifts from the small sprocket to the large one in the rear multi - stage sprocket unit, however, the projection of the outer link plate of the chain comes in contact with the large sprocket on the side because the space between the small and large sprockets is narrow. Although the chain is pushed laterally and displaced toward the large sprocket by the derailleur each edge of the projections can not catch onto a tooth of the large sprocket because the sprocket contacts with the projection on the side. Thus, this arrangement is not free from trouble; it fails to shift up the chain.

Recent exterior shifting assemblies for bicycles tend to have a larger number of stages and an increased ratio of speed changes, so the number of stages in the rear multi - stage sprocket unit inevitably increases. Therefore, the space between sprockets will be narrower, and then it may become more difficult for the chain as described earlier to shift, because it has projections on the right and left outer link plates.

SUMMARY OF THE INVENTION

It is therefore an object of the present invention to provide a chain for a bicycle which can shift smoothly and firmly not only in a front multi - stage sprocket unit, but also in a rear multi - stage sprocket unit.

It is another, more particular object of the present invention to provide a chain for a bicycle which can readily shift without fail for use with a rear multi - stage sprocket unit having a large number of stages and a narrow space between sprockets.

It is furthermore another object of the present invention to provide a chain for a bicycle well improved to enable an outer plate of the chain to catch onto a tooth of a large sprocket gently, causing the chain to shift to the large sprocket from a small one in the rear multi - stage sprocket unit.

In the present invention, one of a pair of outer link plates, which is situated on the large sprocket side of a front multi - stage sprocket unit and which corresponds to a right link plate of a bicycle when viewed from rear and top, swells outwardly along its center edge, forming a recess to lead a tooth of a sprocket. The other outer link plate, which is situated on the large sprocket side in the rear multi - stage sprocket unit, and which corresponds to a left outer link plate of the bicycle when viewed from the rear and top, is formed planar outside and is tapered outwardly from its center edge, producing a recess to lead a tooth of a sprocket.

In such a front multi - stage sprocket unit as composed according to the present invention, the chain is biased toward the large sprocket by the front derailleur to have the projection of the right outer plate catch onto a tooth of a sprocket, and the tooth may slip into the outwardly spread recess formed by the projection, getting the chain to shift from the small sprocket to the large one with ease. Since the right outer link plate projects outwardly on the center edge, but the front multi - stage sprocket unit has a small number of stages and a comparatively wide space between sprockets, it does not happen that the projection interferes with the large sprocket on the side and disturbs speed changes.

On the other hand, the chain in the rear multi - stage sprocket unit is biased toward the large sprocket by the rear derailleur, thereby the tapered face of the edge of the left outer link plate catches onto a tooth of a large sprocket, which can slip into the recess formed by the tapered face. This assures that the chain shifts from the small sprocket to the large one without any difficulty. As mentioned earlier, the rear multi - stage sprocket unit has a large number of stages and a comparatively narrow space between sprockets, but the left outer link plate is formed flat outside, so the plate does not interfere with the large sprocket, and the chain is shifted with ease.

BRIEF DESCRIPTION OF THE DRAWINGS

FIG. 1 is a plan view of a chain for a bicycle embodied according to the present invention;

FIG. 2 is an elevation of FIG. 1;

FIG. 10 is an elevation of an exterior gear shifting assembly for a bicycle.

DETAILED DESCRIPTION OF THE PREFERRED EMBODIMENT

Figure 3:
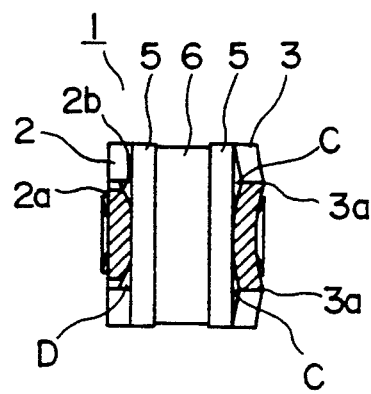
FIG. 3 is a sectional view taken along line III—III of FIG. 1.

FIG. 1 through FIG. 3 show an embodiment of the present invention. A chain 1 for a bicycle comprises a roller chain and is basically composed of left and right outer link plates 2 and 3, right and left inner link plates 5, a roller 6, a bush (not shown), and a pin 7. The chain 1 for a bicycle has an inner link 9 wherein the right and left inner link plates 5, are coupled by means of bushes with each other at their front and rear ends, and wherein the roller 6 is fitted rotatably onto the bush. The chain 1 has an outer link 10 wherein the right and left outer link plates 2 and 3 are coupled with each other at their front and rear ends by means of the pin 7 fitted into the bush to form an endless chain. The inner link 9 has a conventional form, however, and the outer link 10 and the outer link plates 2 and 3, in particular, have the forms showing a feature of the present invention.

An exterior gear shifting assembly 11, as shown in FIG. 10, is comprised of a front multi-stage sprocket unit 13 provided with, for example, two stages, a rear multi-stage sprocket unit 15 provided with, for example, four stages, the chain 1, a front derailleur 16 and a rear derailleur 17. The assembly 11 is generally situated on the right of a frame 12 of a bicycle when viewed from rear and top. The front multi-stage sprocket unit 13 contains a large sprocket 19 outside and a small sprocket 20 inside (toward the frame side), while the rear multi-stage sprocket unit 15 a large sprocket 21 inside (toward the frame side) and a smaller sprocket 22 outside. The front multi-stage sprocket unit 13 has a small number of stages, while the rear multi-stage sprocket unit 15 has a large number of stages. The units tend recently to have a larger number of stages. Therefore, a space A between sprockets in the front multi-stage sprocket unit 13 (see FIG. 8) is wider than a space B between sprockets in the rear multi-stage sprocket unit 15 (see FIG. 9).

When the chain 1 is set around the front and rear multi-stage sprocket units 13 and 15, the outer link plate 3 (referred to as "right outer link plate" hereafter) which is arranged outside the frame 12, has projections 3a which swell outwardly on the upper and lower edges of a central portion of the outer link plate 3, forming recesses C which spread outwardly on the outer link 10, as shown in FIG. 1 or FIG. 3.

The right outer link plate 3 has the projection 3a which catches onto a tooth of a sprocket, slidably leading it to the recess C and, enabling the chain 1 to shift gently and firmly from the small sprocket 20 to the large sprocket 19 in the multi-stage sprocket unit 13.

When the chain 1 is set around the front and rear multi-stage sprocket units 13 and 15, on the other hand, the outer link plate" 2 (referred to as "left outer link plate hereafter) arranged inside the frame 12, has an outside face 2a which is flat, and outwardly tapered faces 2b in a central portion inside the link plate 2. Further, the tapered face 2b of the plate 2 forms a recess D inside the outer link 10. Since the left outer link plate 2 has the tapered face 2b, which catches onto a tooth of a sprocket, slidably leading the tooth into the recess D, the chain 1 shifts smoothly and firmly from the small sprocket 22 to the large sprocket 21 in the rear multi-stage sprocket unit 15.

Figure 4:
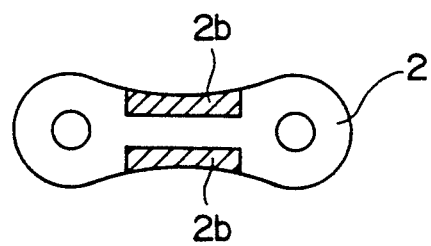
FIG. 4 is an elevation of a left outer link plate shown in FIG. 3.
Figure 5:
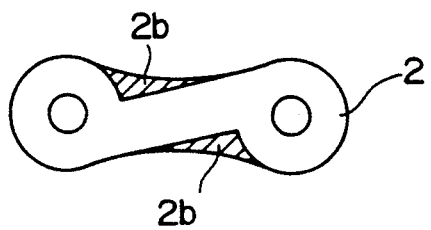
FIG. 5 is an elevation of a partially modified left outer link plate.
Figure 6:
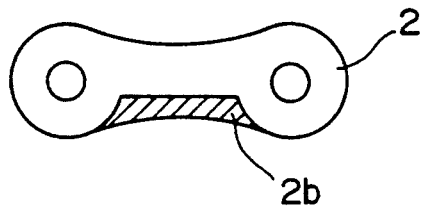
FIG. 6 is an elevation of a modified left outer link plate shown in FIG. 4.
Figure 7:
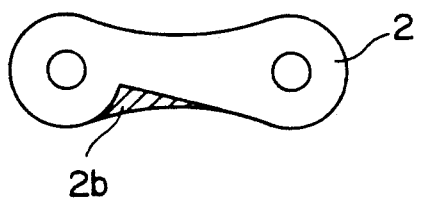
FIG. 7 is an elevation of a modified left outer link plate shown in FIG. 5.

FIG. 4 is an elevation of the left outer link plate 2 and the slant-lined part shows the tapered face 2b. The outwardly tapered face 2b may be different in depth at the front and the rear of the outer link plate 2 as shown in FIG. 5. Namely, the tapered face 2b is so formed that it is deeper on the downstream of the running direction of the chain and shallower on the upstream so it catches on a tooth of the sprocket at the deeper part thereof. It is also possible that the tapered face 2b is formed only on the side where it catches onto the sprocket, as shown in FIG. 6 and FIG. 7.

Figure 8:
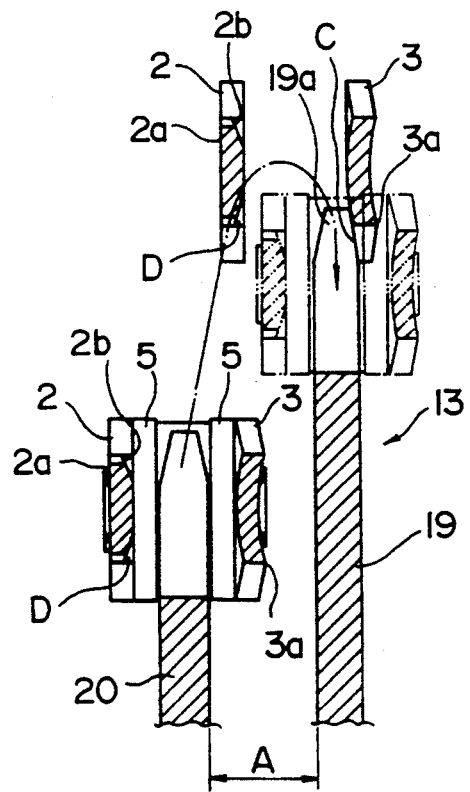
FIG. 8 is a sectional view of a chain shifting in a front multi-stage sprocket unit.

The projection 3a of the right outer link plate 3 is produced by pressing while the tapered face 2b of left outer link plate 2 is produced by chamfering. From a point of gearing function, it is sufficient for the right and left outer link plates 2 and 3 to have the tapered face 2b and the projection 3a only on the inner circumference (downward) of the endless chain 1. However, it is preferable to form the tapered face 2b and the projection 3a on the upper and lower sides of the plates 2 and 3 for convenience of pressing and assembling. This assures that any biased force does not work upon the plate 2 and 3 and that they can be assembled regardless of the differences between top and bottom. FIG. 8 shows schematically how the chain 1 shifts from the small sprocket 20 to the large sprocket 19 in the front multi-stage sprocket unit 15, rotating clockwise when viewed from the right. The chain 1 is pushed rightward as shown in FIG. 8 and is displaced by the front derailleur 16 on the upstream of its running direction, which enables the projection 3a of the right outer link plate 3 at the displaced portion to catch onto a tooth 19a of the large sprocket 19, leading the tooth 19a into the outwardly spread recess C. The chain 1 thereby shifts to the large sprocket 19. Since the space A between the small sprocket 20 and the large sprocket 19 is comparatively wide, it does not happen then that the projection 3a, comes in contact with the large sprocket 19 on the side thereof, although the projection 3a swells outwardly on the right link plate 3.

Figure 9:
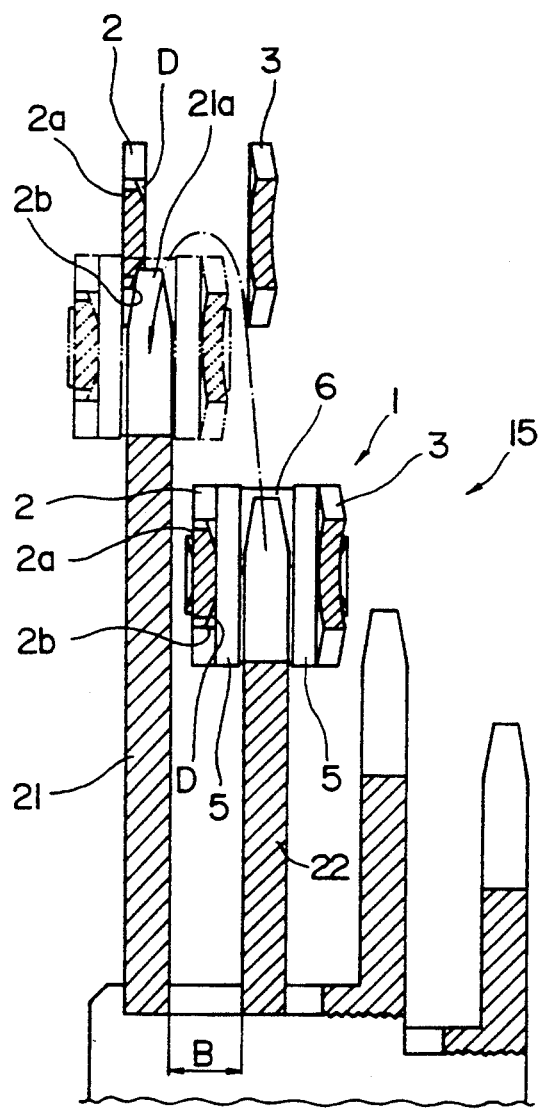
FIG. 9 is a sectional view of a chain shifting in a rear multi-stage sprocket unit.

FIG. 9 shows schematically how the chain 1 shifts from the small sprocket 22 to the large sprocket 21 in the rear multi-stage sprocket unit 15. There is some difference in the arrangement of the small and large sprockets between the rear multi-stage sprocket unit 15 and the front multi-stage sprocket unit 13. The chain 1 is displaced and biased leftward as shown in FIG. 9 by the rear derailleur 17 beneath the sprocket unit 15 and moves onto the large sprocket 21 from the small sprocket 22. The space B between the small sprocket 22 and the large sprocket 21 is narrower than the space A between the sprockets in the front multi-stage sprocket unit 13. The left outer link plate 2 of the chain 1 does not swell outwardly, but is flat at 2a. In addition, the plate 2 is tapered at the enter bottom and its periphery 2b to help the chain change in operating position.

The rear multi-stage sprocket unit 15 rotates clockwise when viewed from the right. The tapered face 2b in the center of the left outer link plate 2 catches onto a tooth 21a of the large sprocket 21 to slidably lead the tooth into the space D, thereby making the chain 1 shift. If a conventional chain, having the right and left outer link plates swelling outwardly, is used for a bicycle, it is biased leftward by the rear derailleur 17, getting the left outer link plate in contact with the large sprocket 21 on the side thereof. If this is the case, it may happen that the chain falls down from the large sprocket over and over trying to catch onto it, which makes a jingling noise. The chain eventually does not shift to the large sprocket. If the chain 1 according the present invention is used, however, for the bicycle, it can surely shift to the large side sprocket 21 almost the same way in operation of the derailleur 17 as in the conventional chain used as noted above. This occurs even if the derailleur 17 is not operated enough.

THE TECHNICAL ADVANTAGES OF THE INVENTION

The chain 1 according to the present invention has the left and right outer link plates 3 and 2 formed to be suitable for the front and rear multi-stage sprocket units 13 and 15.

For the front multi-stage sprocket unit 13 having the comparatively wide space A between the sprockets, the projection 3a of the right outer link plate 3 and the outwardly spread recess C function efficiently. For the rear multi-stage sprocket unit 1 having the narrower space B between the sprockets, the flat face 2a outside the outer link plate 2 works to prevent any sprocket from interfering with a projection on the left outer link plate. Furthermore, the chain 1 according to the present invention has the tapered face 2b and the space D formed inside the left outer link plate 2, so that it can shift from the small sprocket 22 to the large sprocket 21 without any noise and unpleasant vibration. Consequently, it is not observed that the left outer link plate is pushed against the large sprocket 21 to the extent that the chain is not ready until it catches onto the tooth 21a, unlike any conventional chain. And the tapered face 2b and space D formed on the center edge of the left outer link plate 2 enable the chain 1 to shift from sprocket to sprocket smoothly and firmly.

The left outer link plate 2 does not have any projection swelling outwardly and make the chain shift easily. As a result, the space B between the sprockets can be narrower. This makes it possible to increase the number of stages of the rear multi-stage sprocket unit 15, and the gear change stages and gear ratios of the exterior gear shifting assembly for the bicycle.

Since the right outer link plate 3 in the front multi-stage sprocket 13 is provided with the projection 3a and the outward spread recess C, this can be very effective in shifting the chain from the small sprocket 20 to the large sprocket 19, even when a heavier tension is put on the chain to go up a slope.

What is claimed is:

1. An apparatus comprising:
   a plurality of outer links and a plurality of inner links linked alternately and endlessly together in a chain, wherein:
   said outer links comprise a first outer link plate, a second outer link plate and a pair of pins connecting said first outer link plate with said second outer link plate at front and rear portions of each of said first and second outer link plates;
   said inner links comprise a pair of inner link plates disposed between said outer link plates of a said outer link;
   said first outer link plate has a central portion having a projection which swells outwardly along the edge of said central portion so as to define a recess for guiding a tooth of a sprocket; and
   said second outer link plate has a flat face on the side thereof facing outwardly, away from said first outer link plate, and a tapered face on the side thereof facing inwardly, toward said first outer link plate, said second outer link plate thinning along the edge of a central portion of said second outer link plate on said tapered face thereof.

2. The apparatus of claim 1, wherein each said inner link further comprise a pair of bushes connecting said pair of inner link plates, a roller being rotatably mounted on each said bush.

3. The apparatus of claim 1, wherein each said first outer link plate has upper and lower edges along said central portion, a said projection swelling outwardly along both the upper and lower edges of said central portion to define upper and lower recesses.

4. The apparatus of claim 1, wherein said chain has an inner circumference and an outer circumference, said projections of said first outer link plates being formed only along the edges of said central portions along the inner circumference.

5. The apparatus of claim 1, wherein each said second outer link plate has upper and lower edges along said central portion, said second outer link thinning on said tapered face in said central portion of said second outer link plate along both said upper and lower edges.

6. The apparatus of claim 1, wherein said chain has an inner circumference and an outer circumference, said second outer link thinning on said tapered faces only along the edges of said central portions along the inner circumference.

7. A bicycle chain arrangement comprising:
   a plurality of outer links and a plurality of inner links linked alternately and endlessly together in a chain wrapped around a front multi-stage sprocket unit and a rear multi-stage sprocket unit on a bicycle, wherein:
   said outer links comprise a first outer link plate, a second outer link plate and a pair of pins connecting said first outer link plate with said second outer link plate at front and rear portions of each of said first and second outer link plates;
   said inner links comprise a pair of inner link plates disposed between said outer link plates of a said outer link;
   said first outer link plate has a central portion having a projection which swells outwardly along the edge of said central portion so as to define a recess for guiding a tooth of said front multi-stage sprocket unit, said recess being disposed so as to face in a direction from a smaller sprocket towards a larger sprocket on said front multi-stage sprocket unit; and
   said second outer link plate has a flat face on the side thereof facing outwardly, away from said first outer link plate, and a tapered face on the side thereof facing inwardly, toward said first outer link plate, said tapered face thinning outwardly in a central portion of said second outer link plate, said flat face being disposed so as to face in a direction from a smaller sprocket towards a larger sprocket on said rear multi-stage sprocket unit.

8. The bicycle chain arrangement of claim 7, wherein each said inner link further comprises a pair of bushes connecting said pair of inner link plates, a roller being rotatably mounted on each said bush.

9. The bicycle chain arrangement of claim 7, wherein, when viewed from the rear and top of the bicycle, said first outer link plate is the right outer link plate and said second outer link plate is the left outer link plate.

10. The bicycle chain arrangement of claim 7, wherein each said first outer link plate has upper and lower edges along said central portion, a said projection swelling outwardly along both the upper and lower edges of said central portion to define upper and lower recesses.

11. The bicycle chain arrangement of claim 7, wherein said chain has an inner circumference and an outer circumference, said projections of said first outer link plates being formed only along the edges of said central portions along the inner circumference.

12. The bicycle chain arrangement of claim 7, wherein each said second outer link plate has upper and lower edges along said central portion, said second outer link plate thinning on said tapered face in said central portion of said second outer link plate along both said upper and lower edges.

13. The bicycle chain arrangement of claim 7, wherein said chain has an inner circumference and an outer circumference, said second outer link plates faces thinning only along the edges of said central portions along the inner circumference.

14. The bicycle arrangement of claim 7, wherein the space between each sprocket of said rear multi-stage sprocket unit is narrower than the space between each sprocket of said front multi-stage sprocket unit.

* * * * *